United States Patent [19]

Sing

[11] Patent Number: 4,986,343
[45] Date of Patent: Jan. 22, 1991

[54] THERMAL INSULATING SHADE

[76] Inventor: Peter Sing, 43 Donny Brook Rd., Scarsdale, N.Y. 10583

[21] Appl. No.: 204,235

[22] Filed: Jun. 9, 1988

Related U.S. Application Data

[63] Continuation-in-part of Ser. No. 893,009, Aug. 1, 1986, Pat. No. 4,784,215.

[51] Int. Cl.$^5$ .............................. F24J 2/36; E06B 3/94; A47H 5/00
[52] U.S. Cl. .......................................... 165/41; 165/46; 165/47; 165/135; 165/97; 126/426; 126/429; 160/370.2; 160/DIG. 2; 296/97.7
[58] Field of Search ............. 160/84.1, 368.1, DIG. 2, 160/DIG. 3, 370.2; 126/426, 449, 429, 431; 165/135, 41, 46, 47, 97; 296/95.1, 97.8, 97.7; 62/244, 241; 98/2.11

[56] References Cited

U.S. PATENT DOCUMENTS

| | | | |
|---|---|---|---|
| 2,998,817 | 9/1961 | Armstrong | 165/46 |
| 3,585,812 | 6/1971 | Parker | 62/244 |
| 3,943,726 | 3/1976 | Miller | 98/2.11 |
| 4,020,826 | 5/1977 | Mole | 126/449 |
| 4,054,125 | 10/1977 | Eckels | 126/449 |
| 4,182,307 | 1/1980 | Brindle et al. | 126/426 |
| 4,784,215 | 4/1988 | Sing | 165/46 |

FOREIGN PATENT DOCUMENTS 3721616  3/1988  Fed. Rep. of Germany ........ 62/241

Primary Examiner—John Ford
Attorney, Agent, or Firm—Nathaniel Altman

[57] ABSTRACT

A thermal insulating shade for interior use comprises at least one envelope with substantially parallel side panels which hold insulating air therebetween, at least one of the side panels having a highly reflective surface for reflecting away the sun's heat in summer, and, by reversing the shade, retaining interior heat in winter. The shade may be mounted in spaced relationship to any inadequately insulated interior surface such as a window, roof or door of a building or automobile. The shade envelope may have its air space filled with static air with or without porous insulating foam, or controlled air movement through the shade may be provided. Alternatively, the insulating shade may be formed of two envelopes, one inside the other, or of twin envelopes having a common center wall therebetween; in these embodiments, air may be pumped alternately into and removed from each envelope in turn to provide enhanced insulating effectiveness.

19 Claims, 4 Drawing Sheets

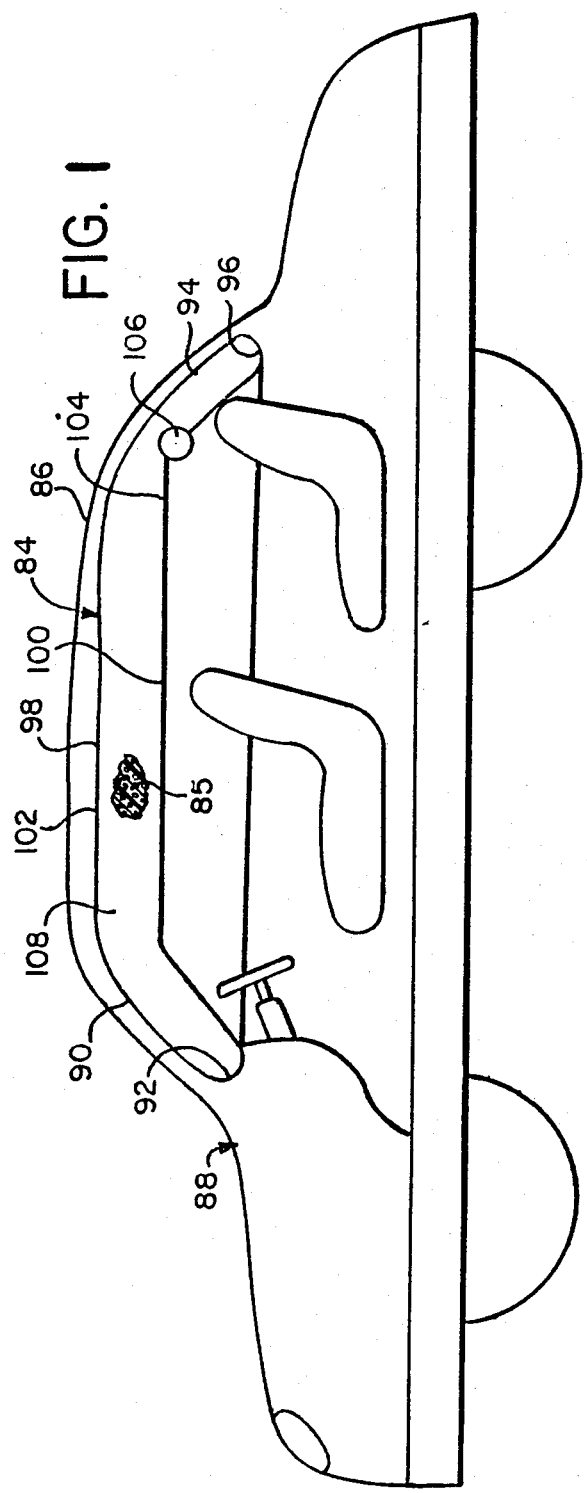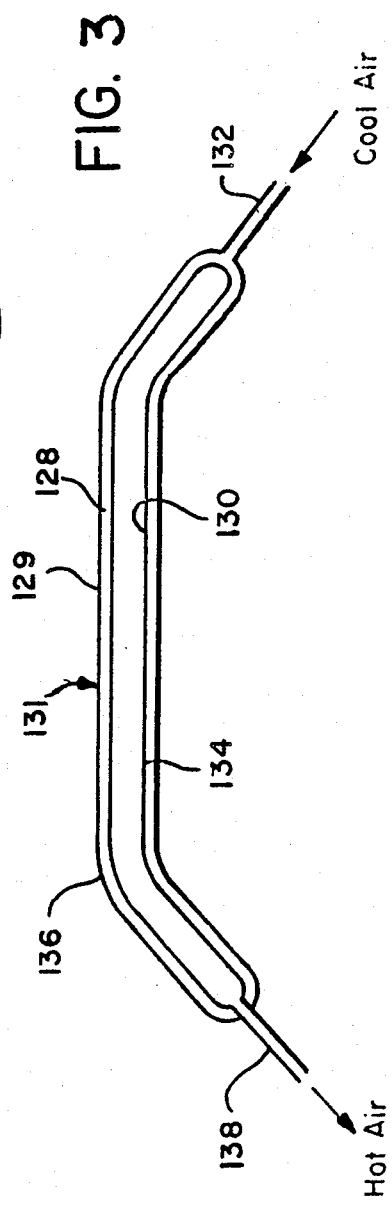

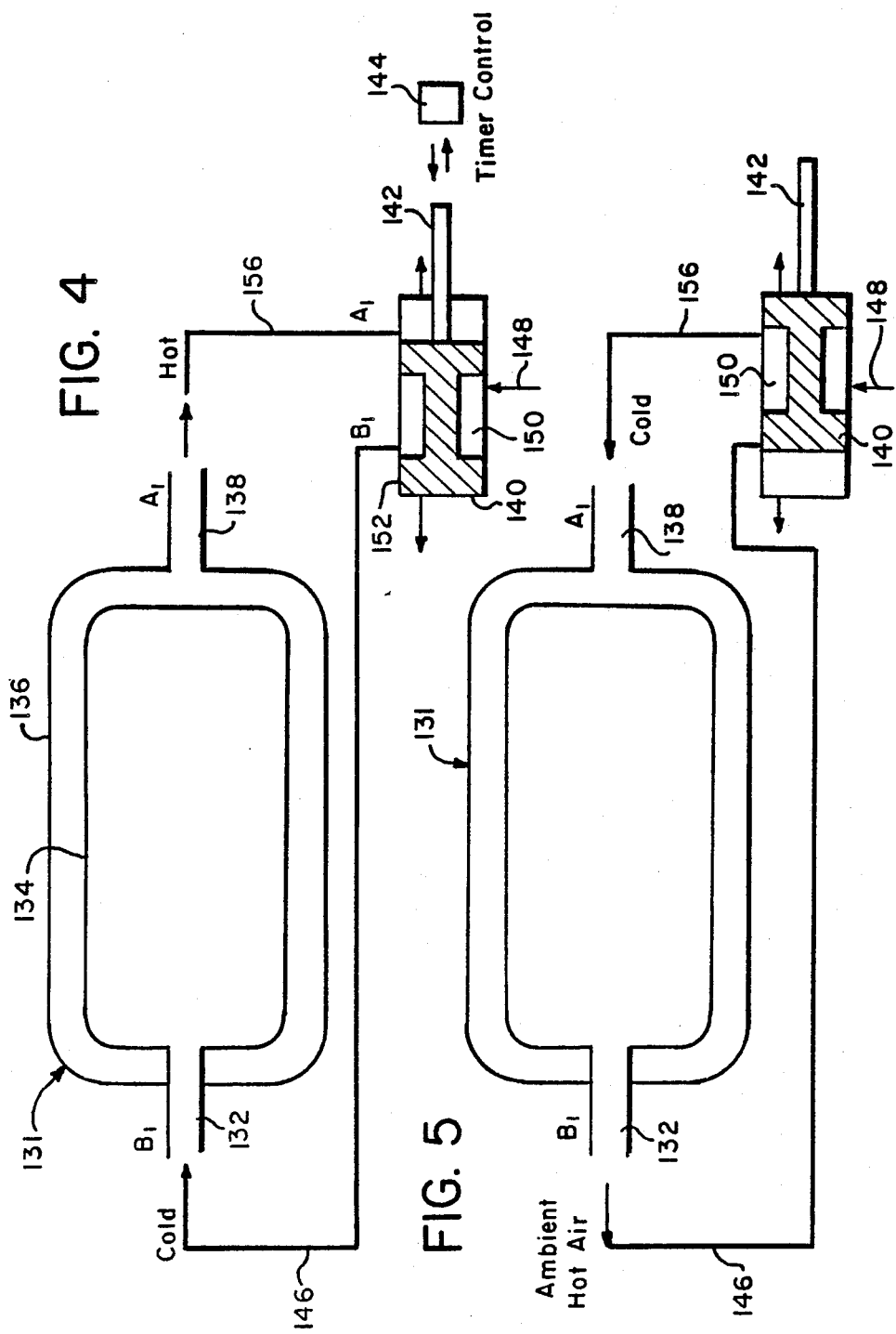

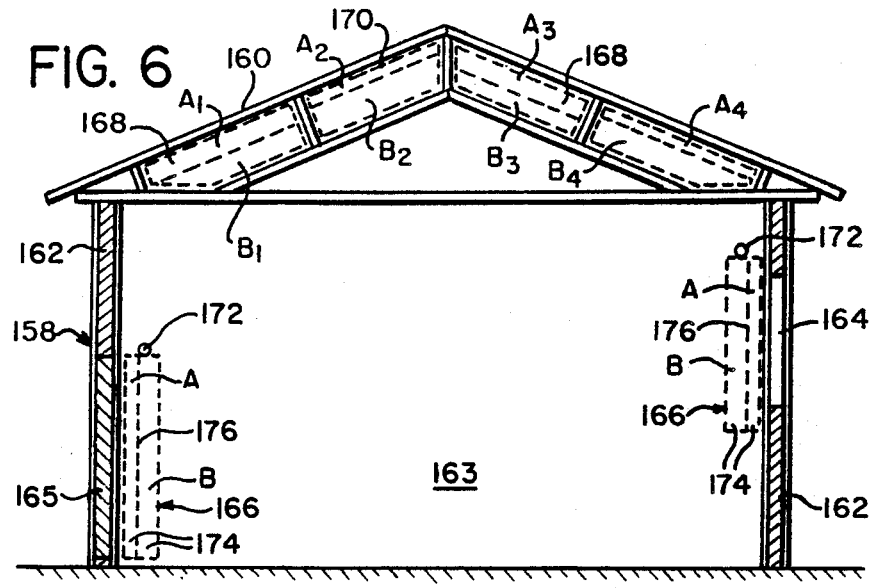
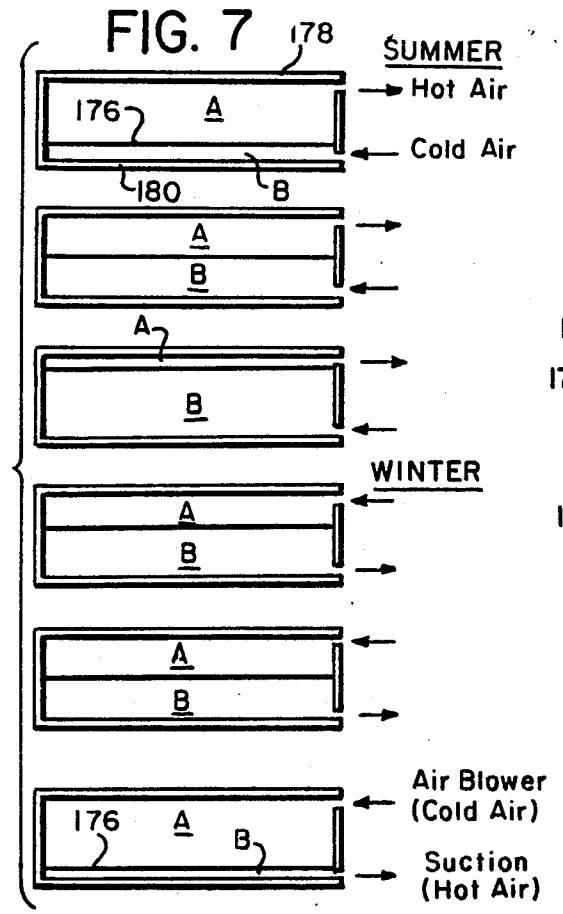
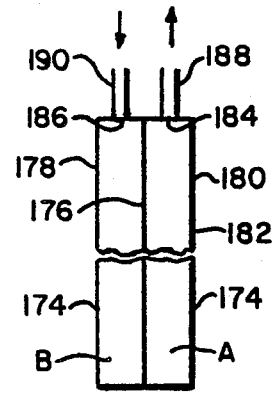

THERMAL INSULATING SHADE

FIELD OF THE INVENTION

This application, a continuation-in-part of parent application Ser. No. 06/893,009 filed Aug. 1, 1986 titled "Thermal Insulating Shades" and granted allowance on May 9, 1988 and now U.S. Pat. No. 4,784,215, is concerned with the species of the parent application non-elected when restriction was required under 35 U.S.C. 121.

The present invention relates to improved thermal insulating shades or covers for interior use in buildings and automobiles. These shades or covers may be placed selectively in proximity to interior surface areas to minimize the transfer of heat from outside these surface areas in hot weather, or to minimize the transfer of heat from inside these surface areas in cold weather, maintaining moderate interior temperatures within automobiles or buildings equipped with the insulating shades.

BACKGROUND OF THE INVENTION

The heat of the boiling summer sun can make an automobile parked in it unbearable to enter, and can penetrate into buildings as well through windows, doors and roofs which are inadequately insulated, causing extreme discomfort, excessive expense for cooling, or both. In like manner, extremely cold weather can cause desirable interior heat to escape from car or building through the same inadequately insulated surfaces, thus causing discomfort and increased heating costs.

While shades with heat-reflective surfaces have been known which moderate the interior conditions of automobiles and buildings by reflecting heat outwardly in the summer and returning it inwardly in cold water, none of the prior art shades are truly efficient insulators, and much room for improvement has remained. It is therefore the principal object of this invention to provide thermally insulating reversible shades of greatly superior efficiency by using a spacing of insulating air separating shade panels which have heat-reflecting surfaces. It is also an object of this invention to provide thermally insulating shades of enhanced effectivenss having circulating air passing between the shade's panels. A further object of this invention is to provide a maximally effective thermal insulating shade by circulating pre-conditioned air therethrough.

SUMMARY OF THE INVENTION

A thermal insulating shade is provided which basically comprises substantially parallelly spaced panels positioned to form an air space therebetween and having a highly heat-reflective surface on one side of at least one of the panels. When the shade is removably mounted with its reflective surface facing a window, for example, heat from the sun will be reflected away from the room with the window; by reversing the shade in cold weather, interior warmth is reflected back to keep the room more comfortable and save heating costs. In either case, the air space between the panels enhances the shade's insulating qualities, helping to keep the room cooler in summer and warmer in winter.

The air space between the parallel panels may be closed, keeping the air static within, or open to permit the circulation of air throughout the shade. Suction cups, releasable adhesive spacers or conventional hangers may be used to mount releasably an insulating shade in spaced relationship to a window, door, roof or other inadequately insulated area reversibly, so that the reflective surface(s) of the shade faces in the desired direction, one way for summer and the opposite way for winter.

The invention includes an interior shade for use in automobiles, for example, wherein the shade is composed of an envelope, of flexible material such as polyester plastic having a reflective surface on each of the parallel side panels thereof which, in summer use, faces the sunny hot exterior of the automobiles. The plastic envelope is filled with air that may be static or actively circulated.

Another form of the invention provides a shade with an inner and an outer envelope, each having mutually parallel panels and heat-reflective surfaces, with means for circulating air through both envelopes; for highest insulating efficiency, cold air may be passed through one envelope while warm air is removed from the other, or the reverse, as desired. The air may be supplied directly from the automobile itself, or from an auxiliary air source, which may be a compressor powered by the car battery which in turn may be energized by a solar cell source. Means may be provided for alternating the direction of air movement through the shade as may be desired for optimum results.

Still another form of the invention provides paired envelopes joined by a common panel, each of the envelopes having an outer panel substantially parallel to the shared common panel. At least one of the panels has a heat-reflective surface and openings are provided so that air may be introduced into and exhausted from each envelope alternately, thus continually removing sun-warmed air in summer or cold air in winter for more effective insulation.

The novel thermal insulating shades of this invention therefore function as sun-ray reflectors to dissipate unwanted hot weather heat; when reversed, they also function as heat collectors in cold weather, so that heat from within a room is reflected back into the room and any warmth from the winter sun is trapped within the shade to help keep the room warm. The combination of the reflective air-separated parallel panels of the shades with means for circulating air therethrough supplies greatly improved thermal insulating efficiency.

BRIEF DESCRIPTION OF THE DRAWINGS

FIG. 1 is a schematic view of an automobile equipped with a preferred thermal insulating shade of this invention;

FIG. 3 is a view in cross-section of a modification of the thermal insulating shade of this invention, with one envelope positioned inside another;

FIGS. 4 and 5 are diagrammatic views of the shade of FIG. 3 connected to an air supply;

FIG. 6 is a view in cross-section of a building using another shade embodiment which has paired envelopes joined by a common panel;

FIG. 7 is a schematic view illustrating the operation of the shades of FIG. 6;

FIG. 8 is a circuit diagram of the air circulation system for a shade of FIG. 6.

DESCRIPTION OF THE PREFERRED EMBODIMENTS

Figure 2:
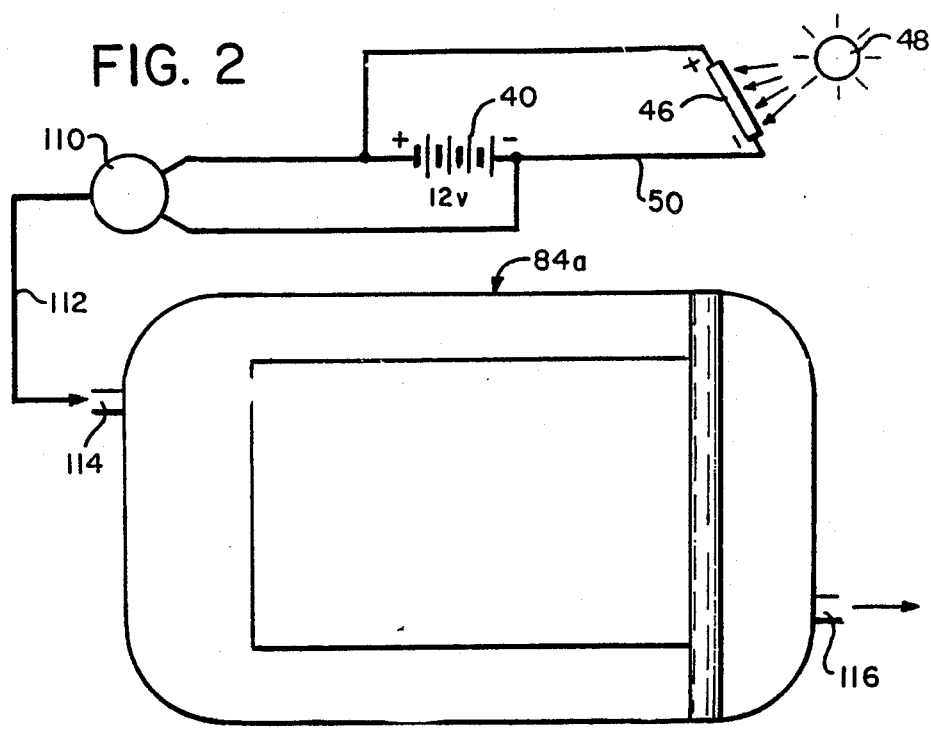
FIG. 2 is a bottom plan view of an alternate shade construction with a diagrammatic showing of an air supply system therefor.

FIG. 1 shows an internal thermal insulating shade or cover 84 formed in accordance with this invention in use for helping to keep the interior of an automobile cool even when parked in the hot summer sun. Interior cover or shade 84 comprises an envelope filled with air and shaped to fit under roof 86 of automobile 88 in spaced relationship thereto, with the fore part 90 of shade 84 resting on automobile front shelf 92, and the rear part of shade 84 resting an auto deck cover 96. The envelope of shade 84 is composed of flexible material such as polyester plastic, with the upper surfaces 98 and 100 of the spaced substantially parallel panels 102 and 104 being covered with a highly heat-reflective coating. Shade 84 may be optionally filled with porous insulating foam 85 to improve its insulating qualities. As shown, panels 102 and 104 are integrally connected at their peripheral edges to form the air-tight envelope of shade 84, which is held in place adjacent the upper interior surfaces of automobile 88 by tubular cross support 106 positioned under the rear bend of unit 84. Thermal shade 84 and insulating foam 85 are filled with a suitable gas, such as air, to hold the device in the desired shape as well as to enhance its insulating characteristics. Provision may be made for emptying shade 84 of air when not in use. In use, however, interior cover 84 acts as a double shade, with insulating air 108 (optionally filled with porous foam 85) positioned between upper panel 102 and lower panel 104, the reflective surfaces 98 and 100 of which contribute significantly to the thermal insulating efficiency of the device. In this manner, shade 84 keeps the interior of car 88 cooler even in the hot sun.

Thermal shade 84a of FIG. 2 is similar to shade 84 of FIG. 1, but is modified to allow air under pressure to be circulated therethrough, the air being supplied by air blower 110 through air hose 112, which is connected to air inlet 114 one end of unit 84a. The air thus introduced circulates through the shade unit exiting at 116 and thereby keeping cool the interiors of shade 84a and of automobile 88 as well.

The motor of air blower 110 is powered by battery 40, the energy of which may be supplemented by auxiliary charging circuit 50. Circuit 50 contains solar cell battery 46 which is exposed to the rays of the sun 48 and collects energy therefrom. Thus, power collected from the sun's rays is used to circulate air through the inside of shade 84a, thus keeping both thermal shade and car interior cool and thus neutralizing the heating effect of the same sun rays.

The thermal insulating shade 131 of FIG. 3 includes an outer envelope or balloon 136 within which an inner envelope or balloon 134 is positioned. Envelopes 136 and 134 are formed of flexible material and are similarly shaped, so that the side panels of both envelopes are substantially parallel; as shown in FIG. 3, the envelopes are shaped, for example, to conform to the roof of an automobile body when filled with air, corresponding to shades 84 and 84a of FIGS. 1 and 2. Cool air enters thermal shade 131 in use via inlet 132, and warm air exits through outlet 138. Inner envelope 134 may be perforated and semi-rigid, whereby cool air entering at 132 circulates through space 128 between envelopes 136 and 134, removing warm air therefrom by forcing it into inner envelope 134 through the perforated walls thereof. As a result, relatively warm or hot air is expelled from shade 131 through outlet 138 of inner envelope 134. As in the previously described embodiments, shade 131 has upper surfaces 129 and 130 of envelopes 136 and 134, respectively, provided with highly heat-reflective surfaces to face and reflect away the sun's rays. This results in a highly efficient shade, combining double reflective surfaces with multiple insulating air spaces.

The air circulation system of FIGS. 4 and 5 operates by the alternate introduction of cool air into the flexible air-tight concentric envelopes of thermal insulating shade 131. Specifically, in FIG. 4, cold air is supplied through port 132 to inner envelope 134, which is positioned within and in spaced parallel relationship to outer envelope 136. Outer envelope 136 is provided with port 138 located at the end of shade 131 opposite to port 132. Air direction-reversing valve 140 with stem 142 controls the air circulating system of the device. Stem 142 is positioned by timer 144, which first connects port 132 as an inlet through hose 146 to source of cold air 148 via annular air passage 150 in piston 152, thereby introducing cold air into envelope 134. At the same time, hot air is discharged from envelope 136 through port 138 via hose 156.

At a preselected time interval, timer 144 causes valve piston 152 (FIG. 5) to move so that the air flow is reversed, by connecting envelope 136 through port 138, now an inlet, to air source 148 via air hose 156. At the same time, port 132 of envelope 134 is reversed to become an air outlet, discharging hot air from the unit via air hose 146. Air flow to and from shade 131 is thus periodically reversed to increase cooling capacity of the shade.

Building 158 shown in FIG. 6 has roof 160 supported by walls 162 which form room 163. One wall 162 contains window 164, which has thermal insulating shade 166 mounted in substantially parallel spaced relationship thereto opposite wall 162 contains door 165, with a second shade 166 mounted identically thereto. Shade 166, embodying yet another modification of the present invention, may take the form of a curtain or drape. Shades 168, similar to shade 166, are mounted spacedly under roof 160 and are provided with corner frames 170, while shade 166 may be hung on curtain rod 172. The construction of thermal shades 166, 168 is substantially the same; for example, shade 166 comprises two identical envelopes 174 positioned in side-by-side relationship and joined together by having panel 176 common to both envelopes. At least one surface of substantially parallel envelope walls or panels 176, 178 and 180 is provided with highly heat-reflective coating 182, which is positioned to face outwardly of room 163 in summer, and inwardly thereof in winter.

Figure 9:
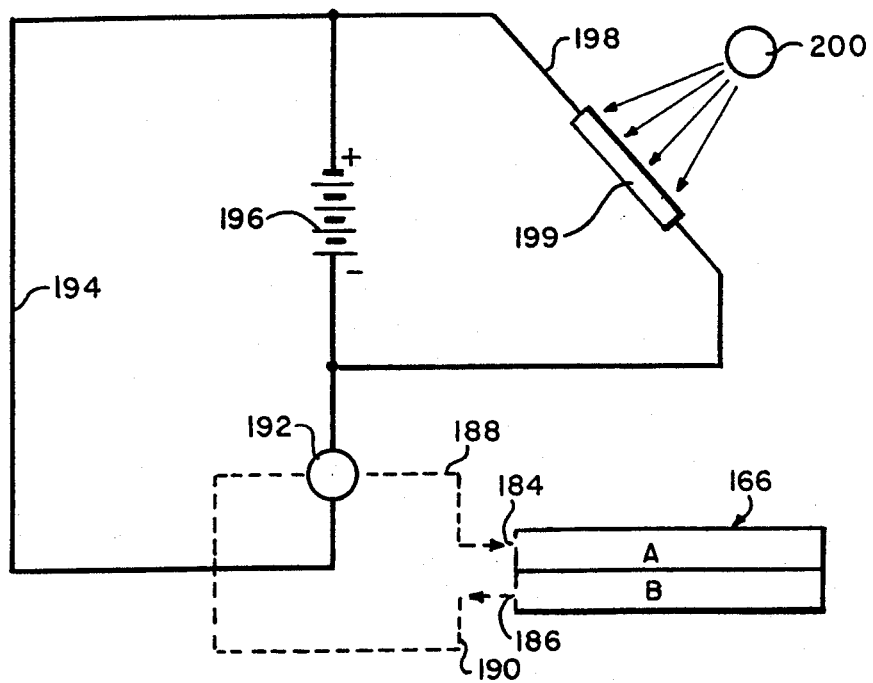
FIG. 9 is a view in side elevation of a shade of FIG. 6.

Shade 166 (see FIGS. 7, 8 and 9) comprises, as indicated above, "siamese" envelopes 174, joined at common wall 176 and designated A and B, each having an air port or opening 184 and 186, respectively. Ports 184 and 186 are both positioned at the same end of device 166 and permit the alternating introduction of air into, and discharge out of, envelopes A and B through air hoses 188 and 190, respectively, both connected to air pressure-vacuum device 192. When actuated, device 192 sequentially causes air to be evacuated from one envelope while introducing air into the other envelope, then repeatedly reversing the direction of air flow at preselected intervals. Air pressure-vacuum device 192 is powered by battery circuit 194, with storage battery 196 charged, in turn, by photovoltaic or solar cell circuit 198, which includes solar cell battery 199, to be energized by sun 200.

The insulating shade 166 operates, for example, to cause envelope A to be filled with air while envelope B is evacuated, as shown in FIG. 7. The cycle is then reversed, causing envelope B to fill with air, apply pressure against common panel 176 and thus helps to empty envelope A. Actually, one envelope collapses while the other is filled, then their roles are cyclically reversed. In this manner, shade 166 acts as a thermal insulating curtain when hung as a drape near a window, by reason of the circulation of air in and out of the contiguous envelopes, its effectiveness being enhanced by the heat-reflecting action of the reflective surface(s) of panels 176, 178 and 180 facing the window in hot weather. Reversal of shade 166 with respect to the window it faces helps to keep heat within the room in winter.

In exactly analogous manner, thermal shades 168, stretched in spaced relationship to areas of roof 160, may have their air envelopes alternately filled with and emptied of air, which, along with the reflective surfaces of their panels, produces highly efficient insulation in the attic area of building 158.

It will be apparent to those skilled in the art that changes may be made in the disclosed embodiments without departing from the concepts and spirit of this invention or from the scope of the following claims.

What is claimed is:

1. Thermal insulating shade for placement adjacent to and substantially overlaying the interior surface of an area to be insulated, the exterior surface of said area being exposed to variable weather conditions including sun's heat and winter's cold, the thermal insulating shade being both reversible and removable, and comprising:
    envelope means comprising at least one pair of substantially parallelly disposed panels, at least one of said panels having a highly heat reflective surface on one side thereof, said at least one pair of panels being joined together around their peripheries to form said envelope means, said panels being shaped to conform in size and shape to the interior surface of the area to be insulated;
    means for supporting said panels in spaced substantially parallel relationship to each other to provide space between each said panel pair;
    means for releasably mounting said envelope means in substantially parallel spaced relationship to the interior surface of the area to be insulated, so that one side of the thermal insulating shade is insulated from the heat or cold prevailing on the other side thereof by reflection from said highly reflective surface as well as by the insulating effect of the air in said air space between said panels; and
    means for introducing air under pressure into said air space between each of said at least one pair of said panels, said air introduction means comprising means for directing air to the thermal insulating shade alternately and sequentially to each of a pair of air access ports, said access ports communicating with said air space so that air introduced into one of said pair of access ports forces air previously introduced through the other of said access ports and contained in the shade to be expelled therefrom.

2. Thermal insulating shade in accordance with claim 1, wherein said means for directing air alternatively and sequentially into the shade comprises a source of air under pressure to create air exchange in the shade and to enhance thereby the insulating capacity of the shade.

3. Thermal insulating shade as defined by claim 2, wherein said means for directing air alternately and sequentially into the shade further comprises:
    storage battery means operatively connected to, and for powering, said air source; and
    an auxiliary battery charging circuit for said storage battery means, said circuit comprising a solar cell battery for charging said storage battery with energy from the sun.

4. Thermal insulating shade as defined by claim 2, wherein said means for directing air alternatively and sequentially further comprises a reciprocating valve and a timer for selectively operating said valve.

5. Thermal insulating shade as defined by claim 1, wherein the inner surface of the area to be insulated is that of the upper part of a vehicle, and wherein the shade comprises said envelope means having generally the shape and size of the vehicle's upper portion and capable of being mounted as an internal thermal cover under the vehicle's upper portion in spaced relationship thereto.

6. Thermal insulating shade as defined by claim 1, wherein said envelope means comprises an inner envelope positioned within an outer envelope so that the four of said panels provided thereby are substantially parallelly spaced from each other, the common surfaces of said four panels facing the same direction and at least one of which being highly heat-reflective, said four panels forming three insulating air spaces therebetween.

7. Thermal insulating shade as defined by claim 6, wherein said inner envelope is provided with an air outlet at one end of the shade, and said outer envelope is provided with an air inlet at the opposite end of the shade.

8. Thermal insulating shade as defined by claim 1, wherein said envelope means comprises:
    a pair of relatively flat spaced envelopes, one of said envelopes being positioned within the other, each of said envelopes having its air port at its end opposite that of the other of said envelopes; and
    said means for introducing air supplying and pumping replacement insulating air into said ports alternately first into one envelope and the n into the other, to keep replacement insulating air in said air space between said panels of said envelope means.

9. Thermal insulating shade as defined by claim 8, wherein said air pumping means further comprises a reciprocating valve and a timer for operating said valve.

10. Thermal insulating shade as defined by claim 8, wherein said envelope positioned within the other of said envelopes is provided with a plurality of spaced perforations to permit circulation of air from one of said envelopes to the other.

11. Thermal insulating shade as defined by claim 1, wherein said envelope means comprises:
    twin envelopes joined together in side-by-side relationship by a common center panel therebetween, each of said twin envelopes having air space on either side of said common center panel and each having an air opening communicating with its air space for the introduction and removal of air; and
    said means for introducing air alternately filling with air and evacuating air from said twin envelopes, so that when one said twin envelope is being filled, the other said twin envelope is being evacuated, thereby making the shade a highly efficient thermal barrier.

12. Thermal insulating shade as defined by claim 11, wherein the interior surface of the area to be insulated is that of a window and wherein said means for releasably mounting said envelope means permits hanging the shade adjacent the window to act as a drape.

13. Thermal insulating shade as defined by claim 11, wherein the interior surface of the area to be insulated is that of a roof and wherein said means for mounting said envelope means supports the shade in spaced relationship to said roof to act as a thermal barrier.

14. Thermal insulating shade as defined by claim 11, wherein said means for introducing air comprises:
 a device for alternately supplying air to and evacuating air from each of said twin envelopes in turn;
 a storage battery and circuit for energizing said device; and
 a solar battery and circuit for energizing said storage battery.

15. Thermal insualting shade as defined by claim 1, for shielding a confined area from teh sun's heat, said means for introducing air further comprising:
 means for supplying cooled air to said air space between said at least one pair of panels of the shade positioned in the confined area, which comprises:
 a source of air under pressure; and
 a solar cell battery with circuit means for connecting and for energizing said air source to supply cooled air to the shade, whereby air in the confined area which tends to be heated by the sun is, in effect, also cooled by virtue of energy derived from the sun, as well as by reflection of the sun's rays away from the confined area by said highly reflective surface of the thermal shade.

16. Thermal insulating shade as defined by claim 1, wherein said at least one highly reflective surface may be positioned to face outwardly in hot weather to reflect away the heat of the sun, and wherein the shade may be reversed in cold weather so that said at least one highly reflective surface faces inwardly to reflect back the interior warmth to the inside, said air space between said at least one pair of panels further enhancing the insulative effectiveness of the shade in both instances.

17. Thermal insulating shade as defined by claim 1, wherein said interior surface of the area to be insulated, on which the thermal shade is to be mounted in spaced substantially parallel relationship, comprises a door.

18. Thermal insulating shade as defined by claim 1, wherein said interior surface of the area to be insulated, on which at least part of the thermal shade is to be mounted in spaced substantially parallel relationship, comprises a vehicle windshield.

19. Thermal insulating shade as defined by claim 1, wherein said envelope means comprises at least two envelopes each having said pair of substantially parallelly disposed panels joined together at their peripheries, said at least two envelopes having independent unconnected air spaces and being so positioned with respect to each other that when air is introduced into said air space of one of said at least two envelopes, air is expelled from the adjacent said air space.

* * * * *